United States Patent [19]

Krenzer et al.

[11] 3,720,684

[45] March 13, 1973

[54] 5-HALO-1,2,4-THIADIAZOLES

[75] Inventors: John Krenzer; Sidney B. Richter, both of Chicago, Ill.

[73] Assignee: Velsical Chemical Corporation, Chicago, Ill.

[22] Filed: Oct. 13, 1970

[21] Appl. No.: 80,487

Related U.S. Application Data

[63] Continuation-in-part of Ser. No. 678,531, Oct. 27, 1967, abandoned.

[52] U.S. Cl. ...260/306.8 D, 260/239 E, 260/239.57, 260/293.87, 260/326.86, 260/326.9, 260/564 A, 260/565, 424/270
[51] Int. Cl. ............................................C07d 91/60
[58] Field of Search...................260/300.8 D, 293.57

[56] References Cited

UNITED STATES PATENTS 2,358,031   9/1944   Roblin et al. ..................260/306.8 D

OTHER PUBLICATIONS

Woerffel et al., Chem. Abstracts, 59:629 (1963).

*Primary Examiner*—Alex Mazel
*Assistant Examiner*—R. J. Gallagher
*Attorney*—Robert J. Schwarz

[57] ABSTRACT

A compound of the formula $$\begin{array}{c} S \\ X-C \diagup \diagdown N \\ \| \quad \| \quad R_1 \\ N\text{------}C-N \\ \diagdown R_2 \end{array}$$

wherein X is halogen, $R_1$ and $R_2$ are each selected from the group consisting of hydrogen, an aliphatic radical, a cycloaliphatic radical, aralkyl, aryl, acyl and trihalomethylmercapto provided that only one of $R_1$ and $R_2$ is hydrogen and forms a hydrocarbon heterocyclic ring with the nitrogen atom to which they are attached. These compounds are useful as fungicides, miticides, nematocides and insecticides.

12 Claims, No Drawings

5-HALO-1,2,4-THIADIAZOLES

This application is a continuation-in-part of our copending patent application Ser. No. 678,531 filed Oct. 27, 1967 now abandoned.

This invention relates to a new class of compounds and to pesticidal compositions containing such compounds as well as to methods of using such compositions to control pests.

The compounds of this invention can be represented by the following general formula:

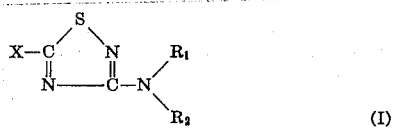

wherein X is halogen and $R_1$ and $R_2$ are each selected from the group consisting of hydrogen, an aliphatic radical, a cycloaliphatic radical, aralkyl, aryl, acyl and trihalomethylmercapto provided that one of $R_1$ and $R_2$ is hydrogen and forms a hydrocarbon heterocyclic ring with the nitrogen atom to which they are attached.

In a preferred embodiment of this invention in the foregoing general formula X is halogen, $R_1$ and $R_2$ are each selected from the group consisting of hydrogen, alkyl of from one to five carbon atoms; allyl; cycloalkyl or cycloalkenyl of from five to seven carbon atoms; phenyl, naphthyl, phenyl substituted alkyl wherein the alkyl group contains from one to five carbon atoms; acetyl and trihalomethyl mercapto and form a hydrocarbon heterocyclic ring with the nitrogen atom to which they are attached containing four or five carbon atoms. The compounds of the present invention are effective as pesticides and particularly as fungicides, miticides, nematocides and insecticides.

The compounds of this invention can be prepared by reacting a guanidine (II), preferably as an acid salt, with a trihalomethanesulfenyl halide (III) in the presence of alkali metal hydroxide according to the following general equation:

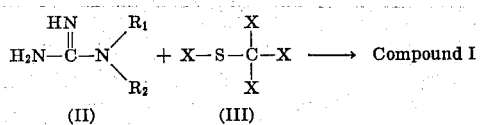

wherein X and $R_1$ and $R_2$ have the same significance as for the compound of formula I above, except that $R_1$ and $R_2$ of the guanidine reactant (II) do not generally include trihalomethylmercapto. For example, X can be a halogen atom such as chlorine, bromine, iodine, or fluorine and preferably chlorine and fluorine; $R_1$ or $R_2$ can be hydrogen; aliphatic such as alkyl of from one to about five carbon atoms or allyl; cycloaliphatic such as cycloalkyl or cycloalkenyl of from five to about seven carbon atoms; aralkyl such as phenyl substituted alkyl wherein the alkyl group contains from one to about five carbon atoms; phenyl; naphthyl; acetyl; and when $R_1$ and $R_2$ form a hydrocarbon heterocyclic ring with the nitrogen atom, such ring can be saturated or unsaturated and contain four or five carbon atoms. The $R_1$ and $R_2$ substituents can also be substituted with groups such as alkyl, alkoxy, amino, nitro or halo or any combination thereof. For example, $R_1$ or $R_2$ or both can be such substituents as haloalkyl, nitroalkyl, aminoalkyl, alkylphenyl, halophenyl, nitrophenyl, or haloacyl.

As can be observed from the above general equation, a wide variety of thiadiazoles, according to this invention, having different 3-substituted amino groups, $R_1$—N—$R_2$, can be conveniently prepared by utilizing a guanidine reactant having the desired $R_1$ and $R_2$ substituents. However, when thiadiazoles of formula I above are desired where $R_1$ and $R_2$ or both are trihalomethylmercapto, then the guanidine (II) used in the reaction should have one of its $R_1$ and $R_2$ substituents as hydrogen. By using such a guanidine, one of the thiadiazole products produced in the reaction will have at least one of its $R_1$ and $R_2$ substituents as trihalomethylmercapto with the trihalomethylmercapto group originating from the trihalomethane sulfenyl halide reactant (III). Examples of suitable guanidine (or aminomethanamidines) represented by the above formula II include such compounds as guanidine; guanidines mono- or disubstituted with aliphatic radicals such as alkyl or alkenyl of from one to about five carbon atoms, for example: 1-methyl guanidine, 1-ethyl guanidine, 1-propyl guanidine, 1,1-dimethyl guanidine, 1,1-diethyl guanidine, 1-methyl-1-ethyl guanidine, 1-allyl guanidine or 1-vinyl guanidine; guanidines mono- or disubstituted with cycloaliphatic radicals such as cycloalkyl or cycloalkenyl of from five to seven carbon atoms, for example: 1-cyclopentyl guanidine, 1-cyclohexyl guanidine, 1,1-dicyclohexyl guanidine, 1-cyclopentyl-1-cyclohexyl guanidine, 1-cyclopentenyl guanidine, or 1-cyclohexenyl guanidine; guanidines mono- or disubstituted with aralkyl such as phenyl substituted alkyl of from one to about five carbon atoms, for example: 1-benzyl guanidine or 1-(3-phenylpropyl) guanidine; guanidines mono- or disubstituted with aryl such as phenyl or naphthyl for example: 1-phenyl guanidine, 1,1-diphenyl guanidine or 1-naphthyl guanidine; guanidine mono- or di-substituted with acyl such as saturated or unsaturated acyl of from one to about five carbon atoms, for example: 1-acetyl guanidine, 2-propionyl guanidine or 1,1-diacetyl guanidine; or guanidines disubstituted with different classes of $R_1$ and $R_2$ groups such as 1-methyl-1-phenyl guanidine, 1-phenyl-1-acetyl guanidine, 1-methyl-1-cyclohexyl guanidine, 1-methyl-1-acetyl guanidine, 1-chloromethyl guanidine, 1-(2-aminopropyl) guanidine, 1-(4-chlorophenyl) guanidine, 1-trichloroacetyl guanidine or 1-chloromethyl-1-(4-chlorophenyl) guanidine. Examples of the guanidine reactant where $R_1$ and $R_2$ form a hydrocarbon heterocyclic ring with the 1-nitrogen atom include: 1-guanyl aziridine, 1-guanyl piperidine, 1-guanyl pyrrolidine, or 1-guanyl pyrrole.

Exemplary of the literature disclosing the guanidine reactants are:

| | |
|---|---|
| N-methyl guanidine | Beilstein 4, 68 |
| N-ethyl guanidine | Beilstein 4 II, 609 |
| N,N-diethyl guanidine | Beilstein 4 121, II 611 |
| N-cyclohexylguanidine | C. A. 59, 9827g |
| N-allylguanidine | Beilstein 4 210 |
| N-(methylallyl) guanidine | C. A. 60 14396d |
| N-phenylguanidine | Beilstein 12 369 |
| N,N-tetramethylene guanidine | Beilstein 20 II 36 |
| N-butyrylguanidine | Beilstein 3 II 74 |
| N-acetyl guanidine | Beilstein 3 88 |

Other guanidine salts may be prepared by known procedures, such as the reaction of a primary or secondary amine having $R_1$ and $R_2$ substituents attached to the nitrogen atom as desired in the final product with S-methyl isothiourea methylsulfate.

The trihalomethylsulfenyl halide (III) used in the reaction preferably is trichloromethanesulfenyl chloride. When using this preferred reactant, the thiadiazole product represented by formula I will have X as chloro, and when preparing thiadiazoles where $R_1$ or $R_2$ or both are trihalomethylmercapto, such substituents will be trichloromethylmercapto. If thiadiazoles are desired having X other than chloro, then other halomethanesulfenyl halides can be used such as tribromomethanesulfenyl bromide. Alternatively, other preparational methods can be employed, for example, by first preparing a thiadiazole having X as chloro and then replacing the chlorine atom with a different halogen atom in a suitable halogen exchange reaction.

In effecting the preparational reaction of the guanidine (II) with a trihalomethanesulfenyl halide (III), the conditions and procedures used can be widely varied. Generally, the conditions and procedures commonly used for the preparation of thiadiazoles by a condensation and ring closure reaction of an amidine salt and a trihalomethanesulfenyl halide in the presence of an alkali metal hydroxide can be suitably utilized. Typically, the first or condensation step of the reaction is effected by simply mixing the reactants such as guanidine hydrochloride and trichloromethanesulfenyl chloride, and a suitable solvent such as methylene dichloride in an appropriate stirred reactor for a period of time sufficient to effect the desired condensation. The second or ring closure step of the reaction can then be effected by adding a suitable quantity of an alkali metal hydroxide such as sodium hydroxide, preferably in aqueous solution, to the reaction mixture and continuing the mixing for a period sufficient to complete the reaction. When the reaction is complete, the desired product can be isolated from side products and purified by conventional methods including distillation, extraction and crystallization. The temperature used in the first step of the reaction can be varied, but generally should be relatively low within a range of from about −20° C to about −5° C, or preferably, about − 10° C. While the temperature used in the second or cyclization step of the reaction can be the same as that used in the first step, generally it is preferable to use a lower temperature within the range from about −20° C to about −10° C. The ratio of the reactants can be varied depending upon such factors as the particular compounds being reacted but generally a stoichiometric ratio of about one mol of the guanidine per one mol of the trihalomethanesulfenyl halide can be suitably used. The quantity of the alkali metal hydroxide such as sodium hydroxide used can also be varied but generally a quantity of at least about three mols per one mol of the guanidine reactant is suitable.

As previously indicated, when compounds of formula I are desired where $R_1$ or $R_2$ or both are trihalomethylmercapto, then the guanidine reactant must have hydrogen as one of its $R_1$ or $R_2$ groups. In preparing this type of compound, the reaction is effected according to the same general procedure as described above except that the reactant ratio can be appropriately adjusted. When the reaction is complete, the desired thiadiazole product substituted in the 3-position with mono- or ditrihalomethylmercaptoamino, is then isolated from the reaction mixture and from any corresponding 3-amino thiadiazole simultaneously produced in the reaction. A particularly suitable method for isolating the desired 3-(mono- or ditrichloromethylmercaptoamino) thiadiazole is to first remove the solvent and any impurities from the reaction mixture, and then sublime the 3-amino thiadiazole product from the desired 3-(mono- or ditrihalomethylmercaptoamino) thiadiazole product. The product can then be purified by conventional means such as crystallization.

Examples of the 1,2,4-thiadiazoles of this invention represented by the above formula I include: 3-methylamino-5-bromo-1,2,4-thiadiazole, 3-ethylamino-5-chloro-1,2,4-thiadiazole, 3-propylamino-5-chloro-1,2,4-thiadiazole, 3 butylamino-5-chloro-1,2,4-thiadiazole, 3-(4-chlorobutylamino)-5-chloro-1,2,4-thiadiazole, 3-(N,N-dimethylamino)-5-chloro-1,2,4-thiadiazole, 3-(N,N-dipropylamino)-5-chloro-1,2,4-thiadiazole, 3-vinylamino-5-chloro-1,2,4-thiadiazole, 3-allylamino-5-chloro-1,2,4-thiadiazole, 3-(N-methyl-N-ethylamino)-5-chloro-1,2,4-thiadiazole, 3-cyclopentylamino-5-chloro-1,2,4-thiadiazole, 3-cyclohexylamino-5-chloro-1,2,4-thiadiazole, 3-cycloheptylamino-5-chloro-1,2,4-thiadiazole, 3-(3-chlorocyclohexylamino)-5-chloro-1,2,4-thiadiazole, 3-(N,N-dicyclohexylamino)-5-chloro-1,2,4-thiadiazole, 3-(N-cyclohexyl-N-cyclopentylamino)-5-chloro-1,2,4-thiadiazole, 3-cyclopentenylamino-5-chloro-1,2,4-thiadiazole, 3-cyclohexenylamino-5-chloro-1,2,4-thiadiazole, 3-benzylamino-5-chloro-1,2,4-thiadiazole, 3-(2-phenylethylamino)-5-chloro-1,2,4-thiadiazole, 3-(3-phenylpropylamino)-5-chloro-1,2,4-thiadiazole, 3-(4'-chlorobenzylamino)-5-chloro-1,2,4-thiadiazole, 3-phenylamino-5-chloro-1,2,4-thiadiazole, 3-naphthylamino-5-chloro-1,2,4-thiadiazole, 3-(4-chlorophenylamino)-5-chloro-1,2,4-thiadiazole, 3-(3-methoxyphenylamino)-5-chloro-1,2,4-thiadiazole, 3-(4-ethylphenylamino)-5-chloro-1,2,4-thiadiazole, 3-(4-nitrophenylamino)-5-chloro-1,2,4-thiadiazole, 3-(N,N-di-4-chlorophenylamino)-5-chloro-1,2,4-thiadiazole, 3-(4-aminophenylamino)-5-chloro-1,2,4-thiadiazole, 3-acetylamino-5-chloro-1,2,4-thiadiazole, 3-propionylamino-5-chloro-1,2,4-thiadiazole, 3-acrylylamino-5-chloro-1,2,4-thiadiazole, 3-trichloroacetylamino-5-chloro-1,2,4-thiadiazole, 3-(N,N-diacetylamino)-5-chloro-1,2,4-thiadiazole, 3-trichloromethylmercaptoamino-5-chloro-1,2,4-thiadiazole, 3-tribromomethylmercaptoamino-5-bromo-1,2,4-thiadiazole, 3-(N,N-ditrichloromethylmercaptoamino)-5-chloro-1,2,4-thiadiazole, 3-(N-methyl-N-phenylamino)-5-chloro-1,2,4-thiadiazole, 3-(N-ethyl-N-cyclopentylamino)-5-chloro-1,2,4-thiadiazole, 3-(N-acetyl-N-phenylamino)-5-chloro-1,2,4-thiadiazole, 3-(N-ethyl-N-benzylamino)-5-chloro-1,2,4-thiadiazole, 3-(N-methyl-N-trichloromethylmercaptoamino)-5-chloro-1,2,4-thiadiazole, 3-piperidyl-5-chloro-1,2,4-thiadiazole, 3-piperidyl-5-bromo-1,2,4-thiadiazole, 3-pyrrolyl-5-chloro-1,2,4-thiadiazole, 3-pyrrolidyl-5-chloro-1,2,4-thiadiazole or 3-aziridinyl-5-chloro-1,2,4-thiadiazole.

The preparation of the compounds of this invention can be illustrated by the following examples:

EXAMPLE 1

3-Phenylamino-5-chloro-1,2,4-thiadiazole is prepared by suspending about 59.1 grams (0.4 mol) of 1-phenyl guanidine hydrochloride in about 400 ml. of methylene chloride contained in a reaction flask equipped with stirring and cooling means. With the temperature at about −10° C, about 44 ml. (0.4 mol) or trichloromethanesulfenyl chloride are slowly added with stirring over a period of about 0.5 hours. A sodium hydroxide solution (80 g.; 2 mols NaOH in 80 ml. of water) is then added over a period of about 0.5 hours with the temperature ranging from about −20° C to about −10° C. The stirring is continued for about 3 more hours with the temperature being allowed to rise to ambient temperature (about 25° C). The methylene chloride layer of the reaction mixture is recovered, water-washed and dried over magnesium sulfate. The methylene chloride solvent is removed from the dried layer by distillation at reduced pressure. The residue is then purified to yield the desired product.

EXAMPLE 2

3-Piperidyl-5-chloro-1,2,4-thiadiazole is prepared by suspending about 56 grams (0.4 mol) of 1-guanyl-piperidine hydrochloride in about 400 ml. of methylene chloride contained in a reaction flask equipped with stirring and cooling means. With the temperature at about −10° C, about 44 ml. (0.4 mol) of trichloromethanesulfenyl chloride are slowly added with stirring over a period of about 0.5 hours. A sodium hydroxide solution (80 g.; 2 mols NaOH in water) is then added over a period of about 0.5 hours with the temperature ranging from about −20° C to about −10° C. The stirring is continued for about 3 more hours with the temperature being allowed to rise to ambient temperature (about 25° C). The methylene chloride layer of the reaction mixture is recovered, water-washed and dried over magnesium sulfate. The methylene chloride solvent is removed from the dried layer by distillation at reduced pressure. The residue is then purified to yield the desired product.

EXAMPLE 3

3-(N,N-Dimethylamino)-5-chloro-1,2,4-thiadiazole is prepared by suspending about 40 grams (0.4 mol) of 1,1-dimethyl guanidine hydrochloride in about 400 ml. of methylene chloride contained in a reaction flask equipped with stirring and cooling means. With the temperature at about −10° C, about 44 ml. (0.4 mol) of trichloromethanesulfenyl chloride are slowly added with stirring over a period of about 0.5 hours. A sodium hydroxide solution (80 g.; 2 mol NaOH in 80 ml. of water) is then added over a period of about 0.5 hours with the temperature ranging from about −20° C to about −10° C. The stirring is continued for about 3 more hours with the temperature being allowed to rise to ambient temperature (about 25° C). The methylene chloride layer of the reaction mixture is recovered, water-washed and dried over magnesium sulfate. The methylene chloride is removed from the dried layer by distillation at reduced pressure. The residue is then purified to yield the desired product.

EXAMPLE 4

3-(N,N-Ditrichloromethylmercaptoamino)-5-chloro-1,2,4-thiadiazole was prepared using the same general procedure of Example 1 except that the residue remaining after removal of the methylene chloride solvent was treated to recover the desired 3-(N,N-ditrichloromethylmercaptoamino) substituted thiadiazole. This treatment was effected by heating the residue at a temperature of about 89° to 90° C under a reduced pressure of about 0.1 mm. Hg. to sublime the 3-amino-5-chloro-1,2,4-thiadiazole product from the desired 3-(N,N-ditrichloromethylmercaptoamino) substituted thiadiazole, The remaining material was recrystallized first from isopropanol and then from heptane to recover the desired yellow colored, crystalline product having a melting point of 89° to 90° C. Analysis calculated for $C_4Cl_7N_3S_3$: Theoretical, percent: C, 11.06; Cl, 57.13; N, 9.67; S, 22.14. Found, percent: C, 10.83; Cl, 56.71; N, 9.77; S, 21.96.

For practical use as fungicides, miticides, nematocides and insecticides, the compounds of this invention are generally incorporated into fungicidal, miticidal, nematocidal and insecticidal compositions which comprise an inert carrier and a fungicidally, miticidally, nematocidally, or an insecticidally toxic amount of such compounds. Such pesticidal compositions, which are known in the art as formulations, enable the active compound to be applied conveniently to the site of the fungus, mite, nematode or insect infestation in any desired quantity. These pesticidal compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly dissolved in these solvents. Frequently, solutions of the fungicides, miticides, nematocides, and insecticides can be dispersed under superatmospheric pressure as aerosols. However, preferred liquid pesticidal compositions are emulsifiable concentrates, which comprise one or more active compounds according to this invention and as the inert carrier, a solvent and an emulsifier. Such emulsifiable concentrates can be extended with water and/or oil to any desired concentration of the active compound for application as sprays to the site of the fungus, mite, nematode or insect infestation. The emulsifiers most commonly used in these concentrates are nonionic or mixtures of nonionic with anionic surface-active agents.

A typical pesticidal composition according to this invention is illustrated by the following examples, in which the quantities are in parts by weight.

EXAMPLE 5

Preparation of a Dust

| | |
|---|---|
| Product of Example 1 | 10 |
| Powdered talc | 90 |

The above ingredients are mixed in a mechanical grinder-blender and are ground until a homogenous, free-flowing dust of the desired particle size is obtained. This dust is suitable for direct application to the site of the fungus, mite, nematocide or insect infestation.

The fungicides, insecticides, nematocides and miticides of this invention can be applied in any manner recognized by the art. One method involves applying to the locus of the pest infestation, a fungicidal, miticidal nematocidal or insecticidal composition comprising an inert carrier and as the essential active ingredient, in a quantity which is toxic to the particular pest, a compound of the present invention. The concentration of the new compounds of this invention in the fungicidal, miticidal, nematocidal or insecticidal compositions will vary greatly depending upon the type of formulation and the purpose for which it is designed, but generally the compositions will contain from about 0.05 to about 95 percent by weight of the active compounds of this invention. In a preferred embodiment of this invention, the pesticidal compositions contain from about 5 to 75 percent by weight of the active compound. The compositions can also contain additional substances such as other stabilizers, spreaders, deactivators, adhesives, stickers, fertilizers, or activators.

When the compounds of the invention are used as insecticides, they can be employed by many different methods. For example, when used as stomach poisons or protective materials, they can be applied to the surface on which the insects feed or travel and when used as contact poisons or eradicants they can be applied directly to the body of the insect; used as a residual treatment, they can be applied to the surface on which the insect may walk or crawl; or used as a fumigant treatment then may be applied to the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compound of the present invention are the chewing insects such as the Mexican bean beetle, the southern armyworm; the piercing-sucking insects, such as the pea aphid, the cereal leaf beetle, the house fly, the grape leafhopper, the chinch bug, the lygus bugs, oyster shell scale, the California red scale, the Florida red scale, the soft scale and mosquitoes; the internal feeders, including borers such as the European corn borer, the peach twig borer and the corn earworm, worms or weevils such as the codling moth, alfalfa weevil, cotton boll weevil, pink boll worm, plum curculio, red banded leaf roller melonworm, cabbage looper and apple maggot, leaf miners such as the apple leaf miner, birch leaf miner and beet leaf miner, and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites are not true insects and chemicals used for their control are defined as miticides. Many economically important species of mites and ticks can be controlled by the compounds of this present invention such as the red spider mite, the two spotted mite, the strawberry spider mite, the cattle tick, the poultry mite, the citrus red mite and the European red mite.

The quantity of active compound of this invention used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erisiphe cichoracearum*), cereal leaf rust on wheat (*Puccinia rubigo-vera*), and such common soil fungi as fusarium wilt (*Fusarium oxysporum*), the seed rot fungus (*Phythium debaranum*), and the sheath and culm blight (*Rhizoctonia solani*). The new compounds of this invention can also be employed as industrial fungicides to control a variety of fungi which attack such materials as adhesives, cork, paints, lacquers, leather, wood, plastics, and textiles such as cotton and wool.

The quantity of active compound of this invention to be used for good disease control will depend on a variety of factors, such as the particular disease involved, the intensity of the infestation, formulation, weather, type of crop and the like. Thus, while the application of only one or 2 ounces of active compound per acre of a crop may be sufficient to control a light infestation of certain fungi, a pound or more of active compound per acre may be required to control a heavy infestation of a hardy species of fungus.

When the compounds of this invention are used as nematocides to control or prevent infestations of destructive nematodes, they are ordinarily used as soil treatments. Plant parasitic nematodes occur in enormous numbers in all kinds of soil in which plants can grow, and many plant pathologists believe that all the crop and ornamental plants grown in the world can be attacked by these nematodes. The destructive species of nematodes range from the highly specialized, which attack only a few kinds of plants, to the polyphagous, which attack a great many different plants. The plants almost invariably become infected by nematodes that move into them from the soil. The underground parts of plants, roots, tubers, corns, and rhizomes are thus more apt to be infected than above-ground parts, but infection of stems, leaves, and flower parts is also fairly common.

Damage to plants attacked by nematodes is due primarily to the feeding of the nematodes on the plant tissues. The nematodes may enter the plant to feed, may feed from the outside, or be only partially embedded. The feeding of a nematode may kill the cell or may simply interfere with its normal functioning. If the cell is killed, it is often quickly invaded by bacteria or fungi. If the cell is not killed, it and the adjacent cells may be stimulated to enlarge or multiply. Hence, the most common types of nematode damage are manifested as rotting of the attacked parts and adjacent tissue or the development of galls and other abnormal growths. Either can interfere with the orderly development of the plant and cause shortening of stems or roots, twisting, crinkling or death of parts of stems and leaves, and other abnormalities. Consequently, the yield of crop plants is reduced, while a high-quality crop cannot be produced from the crippled plants.

The use of the compounds of this invention for nematode control can make the difference between a good crop and one not worth harvesting. Once the nematodes are controlled, yield increases of 25 to 50 per cent are not uncommon. The solid or liquid nematocidal compositions of this invention can be applied to the soil, or in some cases to the plants and soil, in any convenient manner. While broadcast applications to the soil before planting by conventional plow or disc methods are effective, specialized methods such as row placement application, split-dosage applications, post-planting sidedress applications, and the like are also useful. The active compounds of this invention are applied in amounts sufficient to exert the desired nematocidal action. The amount of the active compound present in the nematocidal compositions as actually applied for preventing or controlling nematode infestations varies with the type of application, the particular species which are to be controlled, and the purpose for which the treatment is made, and the like.

The compounds of this invention can be combined with different fungicides, miticides, nematocides or insecticides or combinations thereof to form either synergistic pesticidal compositions or pesticidal compositions capable of more than one pesticidal activity such as a pesticidal composition having both insecticidal and herbicidal properties. For example, the compounds may be combined with insecticides such as halogenated compounds, for example: DDT, methoxychlor, TDE, lindane, chlordane, isobenzan, aldrin, dieldrin, heptachlor, endrin, mirex, endosulfon or dicofol; organic phosphorus compounds, for example: TEPP, schradan, ethion, parathion, methyl parathion, EPN, demeton, carbonphenothion, phorate, zonophos, diazinon, malathion, mevinphos, dimethoate, DBD, ronnel, oxydemeton-methyl, dicapthon, chlorothion, phosphamidon, naled, fenthion, trichlorofon, or DDVP; organic nitrogen compounds, for example: dinitro-o-cresol, dinitrocyclohexylphenol, DNB, DNP, binapacril or azobenzene; organic carbamate compounds, for example: carbaryl, or ortho 5353; organic sulfur compound, for example: phenothiazine, phenoxathin, lauryl thiocyanate, [bis(2-thiocyanoethyl) ether], or isobornyl thiocyanoacetate; as well as such substances usually referred to as fumigants such as hydrogen cyanide, carbon tetrachloride, calcium cyanide, carbon disulfide, ethylene dichloroxide, propylene dichloride, ethylene dibromide, ethylene oxide, methyl bromide or paradichlorobenzene; with fungicides such as: ferbam, nabam, zineb, ziram, thiram, chloranil, dichlone, glyodin, cycloheximide, dinocap, maneb, captan, dodine, PCNB, or tetrachlorothiophene, dazomet or dibromochloropropane and with miticides such as O,O-diisopropyl S-(isopropylthiomethyl) phosphorodithioate, O,O-diisopropyl S-diethyl-dithiocarbamoyl phosphorodithioate, dimefox or dimethoate. The pesticidal activity of the compounds of this invention can be illustrated by the following examples:

EXAMPLE 6

The fungicidal activity of the compounds of this invention can be demonstrated by the following:

An emulsifiable concentrate containing the test compound at a rate of 25 milligrams per milliliter was prepared by dissolving the compound in a suitable solvent such as acetone containing a surface active agent (polyoxyalkylene derivatives of sorbitan monolaurate and/or monooleate; 2.48 milligrams per 80 milliliters of acetone).

3-(N,N-Ditrichloromethylmercaptoamino)-5-chloro-1,2,4-thiadiazole was used to control the fungus *Puccinia rubigo-vera* (leaf rust of wheat). An aqueous fungicidal composition was prepared by admixing the above prepared emulsifiable concentrate with sufficient water to provide the desired concentration of the test compound. A series of 6 day old Henry wheat plants were treated with the compound by spraying the composition for a period of about 30 seconds at a spray pressure of about 80 pounds per square inch. Another series of plants was not treated and was used for comparative purposes. After the treated plants had dried, both the treated and untreated plants were inoculated with a 9 to 13 day old culture of the fungus. The plants were then stored under conditions favorable to fungus growth for a period of about 8 days. At the end of the period, the plants were examined to determine the extent of fungus growth. The extent of the fungus growth on the treated plants was compared to that on the untreated plants and was rated on a percentage basis of the ability of the compound to control or retard fungus growth. The results of the test were as follows:

| Concn. of test compound Parts per million by wt. | % Control |
|---|---|
| 100 | 77.5 |
| 400 | 99.5 |

It was also observed that there was no injury to the plants as a result of the treatment.

EXAMPLE 7

The insecticidal activity of the compounds of this invention can be demonstrated by the following:

3-(N,N-ditrichloromethylmercaptoamino)-5-chloro-1,2,4-thiadiazole was used to control adult houseflies (3 day old *Musca domestica L*). An aqueous insecticidal composition was prepared by mixing the emulsifiable concentrate as prepared in Example 6 above with an amount of water sufficient to provide a concentration of 3500 parts per million by weight of the test compound. The flies were treated by placing a predetermined number of flies into a wire mesh cage and then spraying them with the composition. It was observed that after 24 hours the mortality rate of the flies was 100 percent.

EXAMPLE 8

The miticidal activity of the compounds of this invention can be demonstrated by the following:

3-(N,N-ditrichloromethylmercaptoamino)-5-chloro-1,2,4-thiadiazole was used to control two spotted spider mites [*Tetranychus urticea* (Koch)]. A miticidal composition was prepared by mixing the emulsifiable concentrate as prepared in Example 6 with a quantity of water sufficient to provide a concentration of 3500 parts per million by weight of the test compound. A number of 5 day old Henderson bush lima bean plants were treated by watering with about 30 milliliters of the miticidal composition. Another series of the plants were not so treated and were used for comparative purposes. After drying for about 48 hours, both series of plants were infested with the mites by contacting the plants with leaves cut from plants infested with the mites. The plants were then stored under conditions favorable to mite growth for a period of about 5 days. After this period the treated plants were examined for the presence of mites. The extent of the control of the mites in the treated plants was rated on a percentage basis in comparison to the untreated plants. It was observed that in the treated plants there was 100 percent control. It was also observed that there was no injury or phytocidal effect to the plants as a result of the treatment.

We claim:

1. A compound of the formula

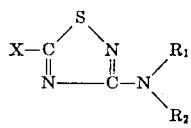

wherein X is halogen, $R_1$ and $R_2$ are each selected from the group consisting of hydrogen, alkyl of from one to five carbon atoms; allyl; cycloalkyl or cycloalkenyl of from five to seven carbon atoms; phenyl, naphthyl, phenyl substituted alkyl of from one to five carbon atoms; acetyl and trihalomethylmercapto, provided that only one of $R_1$ and $R_2$ is hydrogen and form a hydrocarbon heterocyclic ring of five or six atoms with the nitrogen atom to which they are attached containing four or five carbon atoms respectively.

2. The compound of claim 1 wherein one of $R_1$ and $R_2$ is hydrogen.

3. The compound of claim 1 wherein $R_1$ and $R_2$ are trihalomethylmercapto.

4. The compound of claim 3 characterized in that $R_1$ and $R_2$ are trichloromethylmercapto.

5. The compound of claim 1 wherein X is chloro.

6. The compound of claim 1 wherein $R_1$ is alkyl of from one to five carbon atoms.

7. The compound of claim 1 wherein $R_1$ and $R_2$ are selected from the group consisting of cycloalkyl and cycloalkenyl of from five to seven carbon atoms.

8. The compound of claim 1 wherein $R_1$ and $R_2$ are phenyl substituted alkyl where the alkyl group contains from one to five carbon atoms.

9. The compound of claim 1 wherein $R_1$ and $R_2$ are selected from the group consisting of phenyl and naphthyl.

10. The compound of claim 1 wherein $R_1$ is acetyl.

11. The compound of claim 1 wherein $R_1$ and $R_2$ form a hydrocarbon heterocyclic ring of 5 or 6 atoms containing four or five carbon atoms in the ring.

12. The compound of claim 1 wherein it is 3-(N,N-ditrichloromethylmercaptoamino)-5-chloro-1,2,4-thiadiazole.

* * * * *